(12) United States Patent
Arai et al.

(10) Patent No.: US 6,553,964 B2
(45) Date of Patent: Apr. 29, 2003

(54) COORDINATED VALVE TIMING AND THROTTLE CONTROL FOR CONTROLLING INTAKE AIR

(75) Inventors: Masahiro Arai, Yokohama (JP); Hatsuo Nagaishi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 131 days.

(21) Appl. No.: 09/727,789

(22) Filed: Dec. 4, 2000

(65) Prior Publication Data

US 2001/0032613 A1 Oct. 25, 2001

(30) Foreign Application Priority Data

Dec. 3, 1999 (JP) .......................... 11-345373
Dec. 3, 1999 (JP) .......................... 11-345378

(51) Int. Cl.[7] .................... F02D 9/10; F02D 13/02
(52) U.S. Cl. .............. 123/399; 123/90.15; 701/11.5
(58) Field of Search ................ 123/399, 347, 123/348, 90.11, 90.12, 90.15, 90.16, 90.17; 701/101, 102, 103, 105, 115, 110

(56) References Cited

U.S. PATENT DOCUMENTS

| 4,033,304 | A | | 7/1977 | Luria | |
|---|---|---|---|---|---|
| 4,084,557 | A | | 4/1978 | Luria | |
| 4,357,917 | A | | 11/1982 | Aoyama | |
| 4,700,684 | A | | 10/1987 | Pischinger et al. | |
| 5,140,953 | A | | 8/1992 | Fogelberg | |
| 5,224,460 | A | * | 7/1993 | Havstad et al. | 123/90.16 |
| 5,233,948 | A | * | 8/1993 | Boggs et al. | 123/90.15 |
| 5,284,116 | A | | 2/1994 | Richeson, Jr. | |
| 5,377,631 | A | * | 1/1995 | Schechter | 123/198 F |
| 5,785,016 | A | | 7/1998 | Enderle et al. | 123/90.11 |
| 5,996,560 | A | * | 12/1999 | Schechter | 123/348 |
| 6,000,375 | A | | 12/1999 | Isobe | |
| 6,161,521 | A | | 12/2000 | Russ et al. | |
| 6,189,512 | B1 | | 2/2001 | Kawasaki et al. | |
| 6,286,478 | B1 | | 9/2001 | Atago et al. | |
| 6,363,316 | B1 | * | 3/2002 | Soliman et al. | 123/399 |
| 6,390,063 | B1 | | 5/2002 | Obata et al. | |
| 2001/0037780 | A1 | * | 11/2001 | Arai et al. | 123/90.15 |

FOREIGN PATENT DOCUMENTS

| DE | 198 10 298 A1 | 9/1998 |
|---|---|---|
| EP | 0 953 750 A2 | 11/1999 |
| EP | 0 953 750 | 11/1999 |
| EP | 1 063 393 A2 | 12/2000 |
| EP | 1 063 407 A1 | 12/2000 |
| JP | 8-200025 | 8/1996 |
| WO | WO 99/47800 | 9/1999 |

OTHER PUBLICATIONS

U.S. patent application Ser. No. 09/299,098, Nagaishi et al., filed Apr. 25, 1999.

U.S. patent application Ser. No. 09/686,992, Arai et al., filed Oct. 11, 2000.

U.S. patent application Ser. No. 09/727,554, Arai et al., filed Dec. 4, 2000.

(List continued on next page.)

Primary Examiner—Hieu T. Vo
(74) Attorney, Agent, or Firm—Foley & Lardner

(57) ABSTRACT

A system and method control intake air of an internal combustion engine. The engine has at least one combustion chamber provided with intake valves together with an intake manifold provided with a throttle valve. The opening and closure timings of the intake valves are adjustable entirely independently by electromagnetic drivers from the crankshaft position to control the amount of intake air supplied to the combustion chamber. The system and method provide a response adjustment to variable valve timing and throttle valve position controls of the intake valves for unthrottled intake air control.

19 Claims, 10 Drawing Sheets

OTHER PUBLICATIONS

U.S. patent application Ser. No. 09/727,787, Kawasaki et al., filed Dec. 4, 2000.

Patent Abstracts of Japan, vol. 1999, No. 02, Feb. 26, 1999 & JP 10-311231.

Patent Abstracts of Japan, vol. 004, No. 132, Sep. 17, 1980 & JP 55-087834 (Nissan Motor Co. Ltd.) Jul. 3, 1980, Abstract.

Patent Abstracts of Japan, vol. 1997, No. 10, Oct. 31, 1997 & JP 09-170462 (Isuzu Motors Ltd.) Jun. 30, 1997, Abstract.

Patent Abstracts of Japan, vol. 1996, No. 12, Dec. 26, 1996 & JP 8-200025 (Toyota Motor Corp.), Aug. 6, 1996, Abstract.

* cited by examiner

COORDINATED VALVE TIMING AND THROTTLE CONTROL FOR CONTROLLING INTAKE AIR

BACKGROUND OF THE INVENTION

1. Field of the Invention

The present invention relates to a system and method for controlling intake air to an internal combustion engine by unthrottled intake air control.

2. Terminology

Engine Displacement

This is used herein to mean the sum of displacements of all of cylinders of an engine. "Engine displacement" and "displacement of an engine" are synonyms. In the description, the reference character "VOL#" is used to represent the "engine displacement".

3. Description of Related Art

JP-A 8-200025 discloses a system for controlling electromagnetic drivers (EMDs) for intake and exhaust valves provided per each combustion chamber of an internal combustion engine. According to this system, an electronic control unit (ECU) controls valve timings of intake and exhaust valves independently from the crankshaft position and speed in one of predetermined schedules fit for various engine operation ranges. The ECU identifies which one of the various engine operation ranges against varying engine load and engine speed. During transient period from one to another of the engine operation ranges, the ECU shifts the valve timings of intake valves in a gradual manner so as to prevent occurrence of a rapid change in intake air characteristic. This JP-A is silent as to how engine load is controlled and has no teaching with regard to engine load control by early or delayed valve closure timings of the intake valves.

The present invention aims at controlling intake air by varying valve closure timings of intake valves using such EMDs. The electromagnetic drivers can adjust the valve opening and closure timings over a wide range independently from the crankshaft position. Since throttling of intake air is not relied upon to control the engine load, the engine pumping losses are eliminated.

EP 0 953 750 A2, published on November 3, teaches variably adjusting an angular opening angle of a throttle valve to maintain a predetermined negative pressure within an intake manifold downstream of the throttle valve during engine load control by unthrottled intake air control using variable adjustment of intake valve timing. The negative pressure within the intake manifold is needed for purge control. Due to the limitation of speed at which an EMD can move its intake valve, adjustment of valve closure timing becomes ineffective in intake air control in certain operation range. In such operation range, the throttle valve is relied upon to conduct throttled intake air control.

Because of the provision of intake manifold and collector downstream of a throttle valve, there is a delay, during throttled intake air control, between a change in angular position of the throttle valve and a change in cylinder air charge. In the case of unthrottled intake air control, there is no delay caused due to the intake manifold and collector so that a change in valve closure timing induces a change in cylinder air charge without any delay, providing aggressive response performance. For example, operator aggressive repetition of a cycle of depression and release of accelerator pedal induces such violent variation of torque imparted to a power train induces as to cause vibration, providing a reduction in ride comfort and a considerably high level of noise.

As mentioned above, unthrottling intake air control cannot control cylinder air charge satisfactorily in certain operation range. In such operation range, throttling of intake air by a throttle valve is needed. In such case, care must be taken to provide a smooth take over during transient period from the unthrottled control to the throttled control or vice versa without any shock due to a torque change. Undesired torque change might take place during such transient period due mainly to a considerable difference in response performance between the two control modes.

Thus, a need remains to improve an unthrottled intake air control by variable valve timing such that the occurrence of violent torque variation caused by aggressive cyclic depression and release manipulation of an accelerator pedal is prevented and the undesired torque change during transient period from one to the other of the two intake air control mode is suppressed.

SUMMARY OF THE INVENTION

It is an object of the present invention to provide a system and method for controlling intake air to an internal combustion engine such that the occurrence of violent torque variation caused by aggressive cyclic depression and release manipulation of an accelerator pedal is prevented and the undesired torque change during transient period from one to the other of the two intake air controls is suppressed.

According to one aspect of the present invention, there is provided a method for controlling intake air of an internal combustion engine, the engine having at least one combustion chamber provided with intake means together with an intake manifold provided with a throttle valve, wherein the opening and closure timings of the intake means are adjustable entirely independently from the crankshaft position to control the amount of intake air supplied to the combustion chamber, the method comprising:

providing a response adjustment to valve timing control of the intake means for unthrottled intake air control and throttle position control of the throttle valve for unthrottled intake air control.

According to another aspect of the present invention, there is provided a system for controlling intake air of an internal combustion engine, the engine having at least one combustion chamber provided with intake means together with an intake manifold provided with a throttle valve, wherein the opening and closure timings of the intake means are adjustable entirely independently from the crankshaft position to control the amount of intake air supplied to the combustion chamber, the method comprising:

a control for providing a response adjustment to valve timing control of the intake means for unthrottled intake air control and throttle position control of the throttle valve for unthrottled intake air control

BEST MODES FOR CARRYING OUT THE INVENTION

Figure 1:
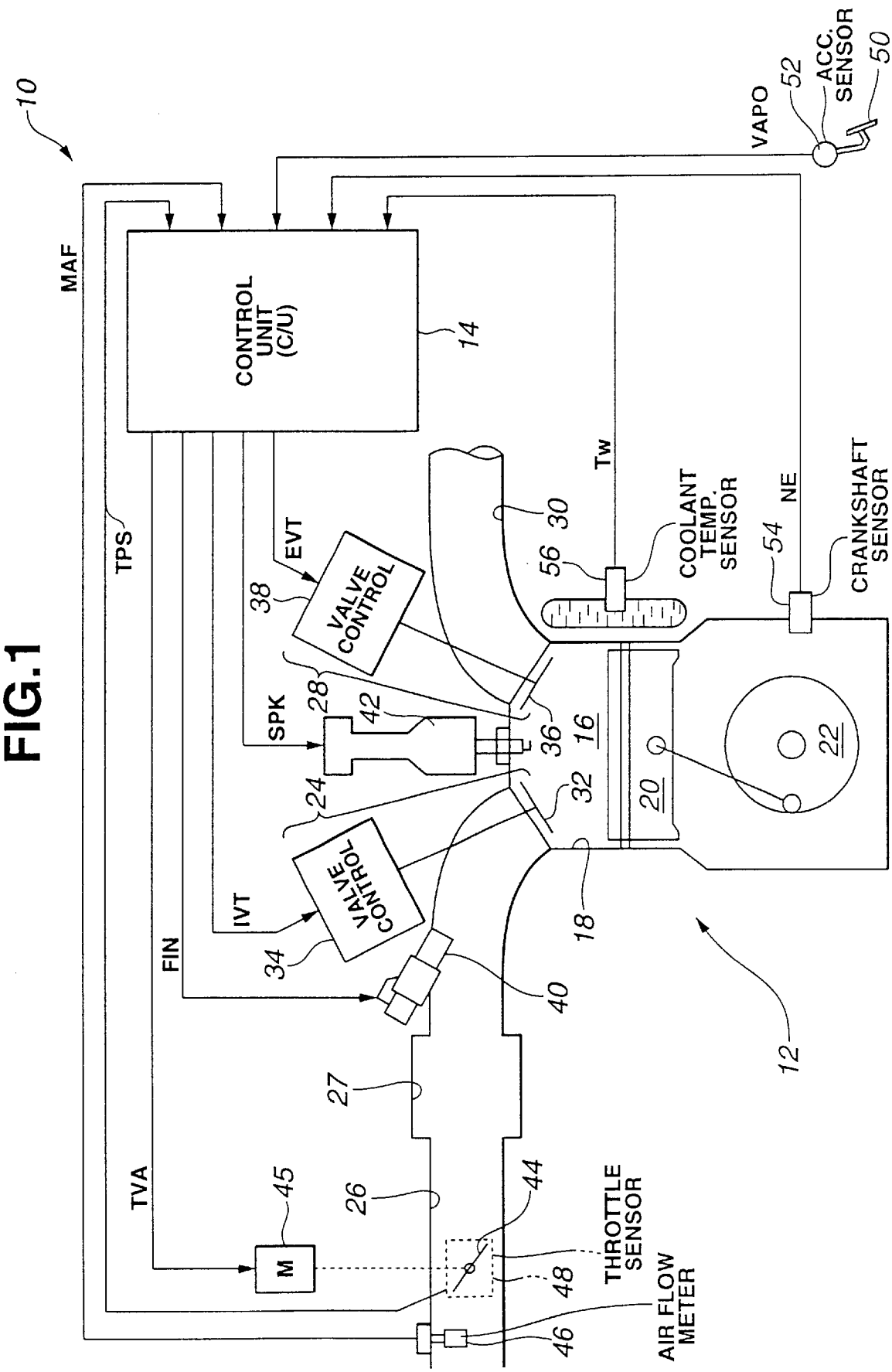
FIG. 1 is a block diagram illustrating a system and method for controlling intake air to an internal combustion engine according to the present invention.

FIG. 1 is a block diagram illustrating operation of a system or method for controlling intake air by variable intake valve timing with response performance adjustment according to the present invention. System 10 includes an internal combustion engine, indicated generally by reference numeral 12, in communication with a control unit (C/U) 14. As schematically shown in FIG. 1, engine 12 has at least one combustion chamber 16 defined within a cylinder 18 by a reciprocating piston 20 operatively connected to a crankshaft 22. Combustion chamber 16 is provided with intake means 24 together with an intake manifold 26, including a collector 27, and exhaust means 28 together with an exhaust manifold 30. Intake means 24 include at least one intake valve 32, each driven by a variable valve control 34. Exhaust means 28 include at least one exhaust valve 36, each driven by a variable valve control 38. Fuel is injected into combustion chamber 16 through an injection nozzle 40. A spark plug 42 produces a spark to initiate combustion of combustible charge within combustion chamber 16. A throttle valve 44 is provided to control air inflow to intake manifold 26.

Various sensors are provided to monitor engine operation conditions. Sensors may include an air flow meter 46, which provides a mass airflow (MAF) signal to C/U 14 to monitor the air intake into intake manifold 26. A throttle sensor 48 provides a throttle position sensor (TPS) signal to C/U 14 to monitor the throttle opening angle or position of throttle valve 44. An accelerator pedal 50 is used to determine the operator or driver torque request command. An accelerator sensor 52 provides a vehicle accelerator pedal opening (VAPO) or pedal position signal indicative of the accelerator pedal opening angle or position of accelerator pedal 50.

Engine 12 includes various other sensors such as a crankshaft sensor or engine speed sensor 54, which provides a signal indicative of engine speed (NE) to C/U 14, and an engine coolant temperature sensor 56. Engine coolant temperature sensor 56 provides an engine coolant temperature (Tw) signal indicative of the engine coolant temperature to C/U 14.

Figure 2:
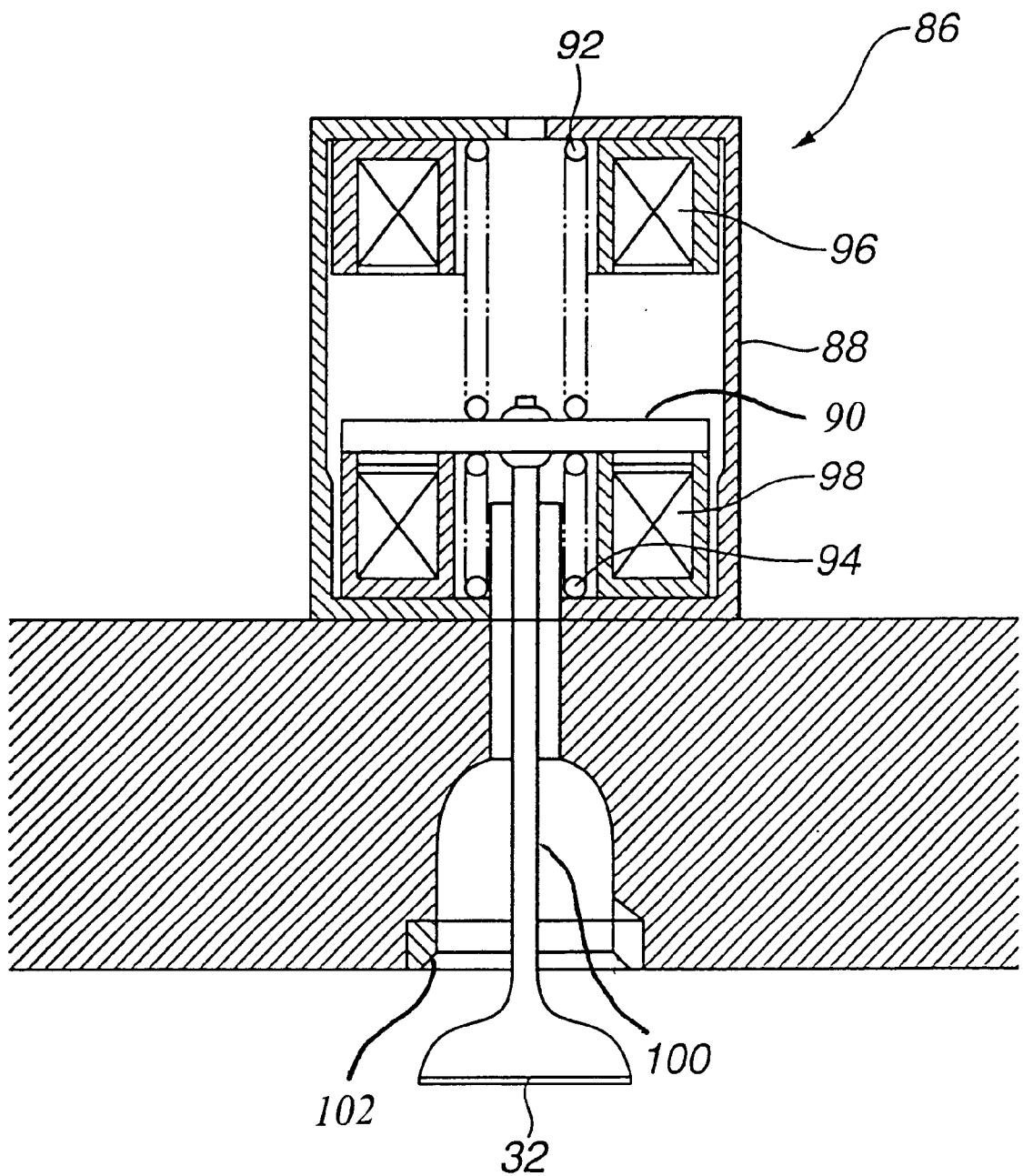
FIG. 2 is a schematic view of an electromagnetic driver (EMD) used in each of valve controls for intake and exhaust valves of the engine.

FIG. 2 provides a schematic view of an EMD 86, which is used in each of valve controls 34 and 38, for the associated cylinder valve, for example, intake valve 32. EMD 86 includes a housing 88, a movable plate 90 is kept in a neutral position, as illustrated in FIG. 2, within housing 88 by means of two springs 92 and 94. Springs 92 and 94 are arranged on one and the opposite sides of movable plate 90. At the remotest ends, springs 92 and 94 bear against housing 88. At the nearest ends, springs 92 and 94 bear against spaced walls of movable plate 90. Two electromagnetic coils 96 and 98 are mounted to housing 88 on one and the opposite sides of movable plate 90. With no supply of electric current through electromagnetic coil 98, supply of electric current through electromagnetic coil 96 attracts movable plate 90 for movement against the action of spring 92. Supply of electric current through electromagnetic coil 98 with no supply of electric current through electromagnetic coil 96 attracts movable plate 90 for movement against the action of spring 94. In order to transmit at least movement of movable plate 90 in a direction against spring 94 to intake valve 32, the valve stem is operatively connected to movable plate 90. Thus, with no supply of electric current through electromagnetic coil 96, supply of electromagnetic coil 98 can hold intake valve 32 lifted from a rest position where intake valve 32 rests on a valve seat 102. In this embodiment, valve stem 100 is fixed to movable plate 90 so that supply of electric current through electromagnetic coil 96 with interruption of supply of electric current through electromagnetic coil 98 can hold intake valve 32 to the rest position.

Figure 3:
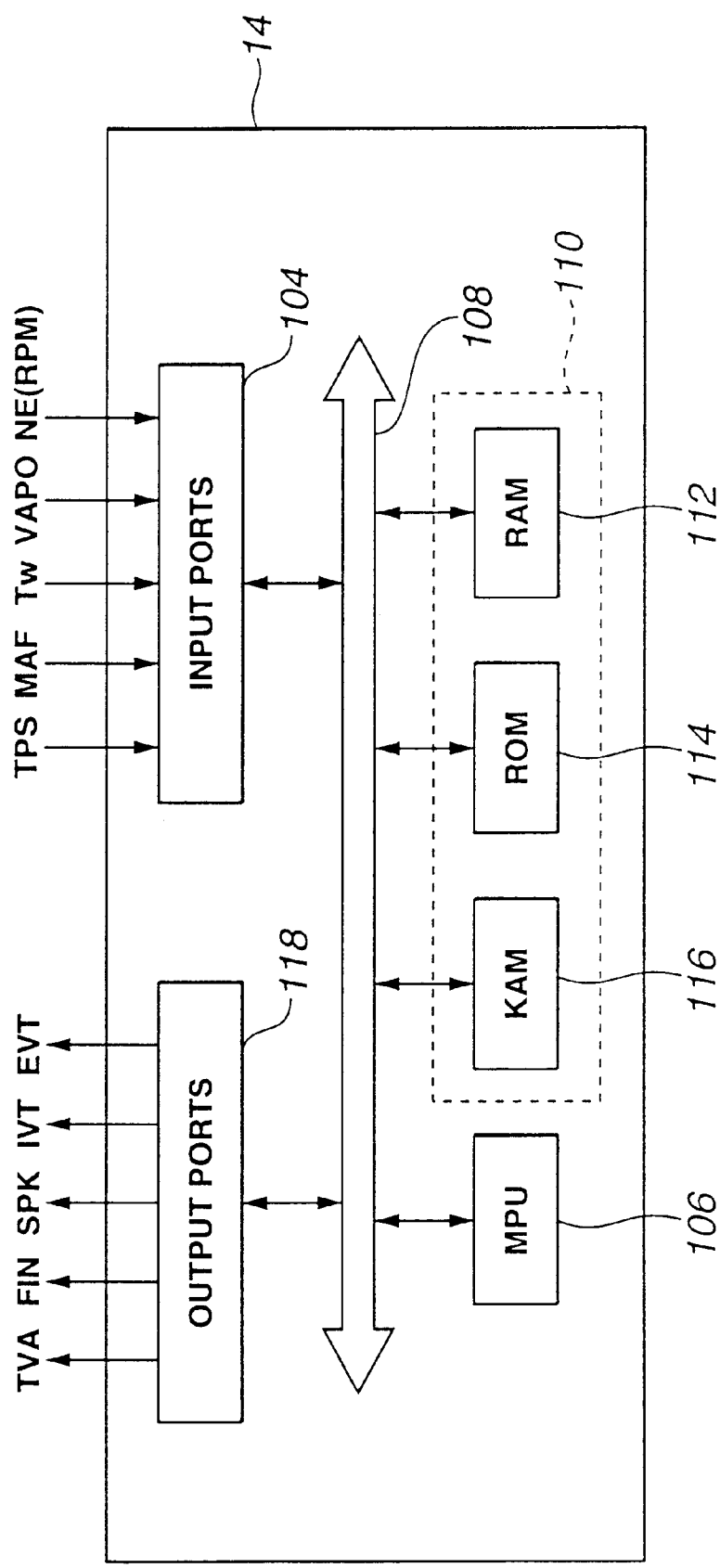
FIG. 3 is a block diagram of a control unit implementing the present invention.

Referring to FIG. 3, C/U 14 receives signals from the various sensors via input ports 104, which may provide signal conditioning, conversion, and/or fault detection as well known in the art. Input ports 104 communicate with processor (MPU) 106 via a data/control bus 108. MPU 106 implements control logic in the form of hardware and/or software instructions, which may be stored in a computer-readable media 110 to effect intake air control for engine 12. Computer-readable media 110 may include various types of volatile and nonvolatile memory such as random-access memory (RAM) 112, read-only memory (ROM) 114, and keep-alive memory (RAM) 116. These functional classifications of memory may be implemented by one or more different physical devices such as PROMs, EPROMs, EEPROMs, flash memory, and the like, depending upon the particular application.

MPU 106 communicates with various actuators of engine 12 via output ports 118. Actuators may control ignition timing or spark SPK, timing and metering of fuel FIN, position of throttle valve TVA to control air inflow, intake valve timing (IVT) to control intake air into combustion chamber and exhaust valve timing (EVT). In operation range where throttled intake air control is required, the position of throttle valve 44 is variably adjusted by an actuator in the form of a motor 45 to control intake air into combustion chamber 16 and intake valve closure (IVC) timing is adjusted by EMD 86 to provide a valve opening duration in the neighborhood of the least duration. In operation range where unthrottled intake air control is required, IVC control is performed and the position of throttle valve 44 to adjusted so as to maintain boost pressure within intake manifold at a target negative pressure value. In IVC control, intake valve closure (IVC) timing is variably adjusted to control intake air into combustion chamber 16 without relying on throttling of airflow by throttle valve 44.

Figure 5:
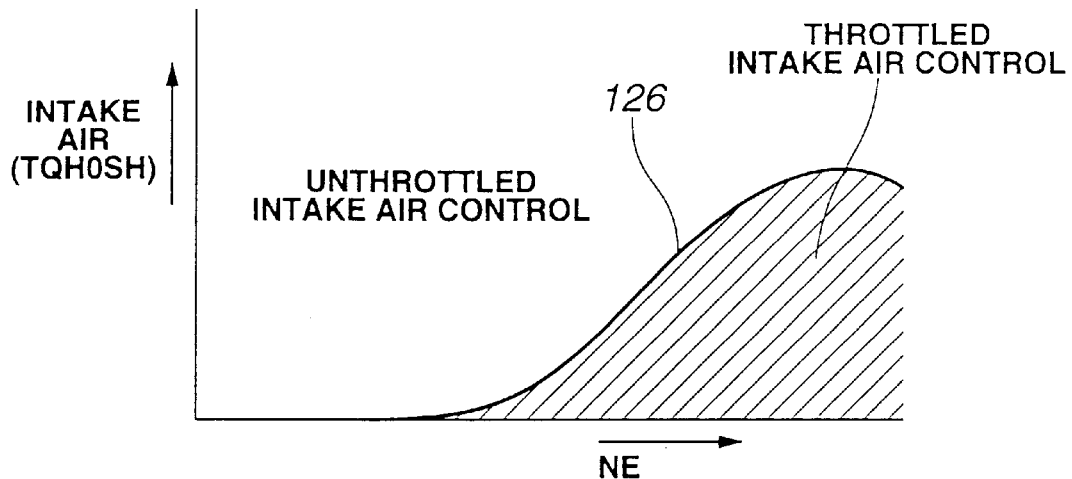
FIG. 5 is a graphical representation illustrating intake air control schedule.

FIG. 5 illustrates, by a shadowed area, low-load high-speed operation range where throttled intake air control is to be performed. An area not shadowed in FIG. 5 illustrates operation range where throttled intake air control is to be performed.

In the low-load high-speed operation range, it is impossible to accomplish a target intake air by early valve closure timing because the minimum valve opening duration is determined independently of the crankshaft position and speed by EMD 86.

With the minimum valve opening duration having the earliest valve closure timing, increasing the crankshaft speed results in a delay in valve closure timing in terms of crankshaft angular position. Thus, in the low-load high-speed operation range as indicated by the shadowed area in FIG. 5, it is impossible to accomplish the target intake air by early intake valve closure with the wide open throttle (WOT).

In a preferred embodiment, in operation range not shadowed in FIG. 5, unthrottled intake air control is performed to accomplish a target value by variably adjusting IVC timing with boost pressure within intake manifold 26 maintained constant by variably adjusting throttle valve 44. In low-load high-speed operation range as indicated by shadowed area in FIG. 5, throttled intake air control is performed to accomplish a target value by variably adjusting throttle position of throttle valve 44 to vary the boost pressure with the IVC timing adjusted in the neighborhood of the minimum valve opening duration.

In the preferred embodiment, MPU 106 executes instructions stored in computer-readable media 110 to carry out a method for intake air control to communicate with EMD 34 of for intake valve 32 and motor 45 for throttle valve 44 for unthrottled intake air control in coordination with throttled intake air control.

Figure 4:
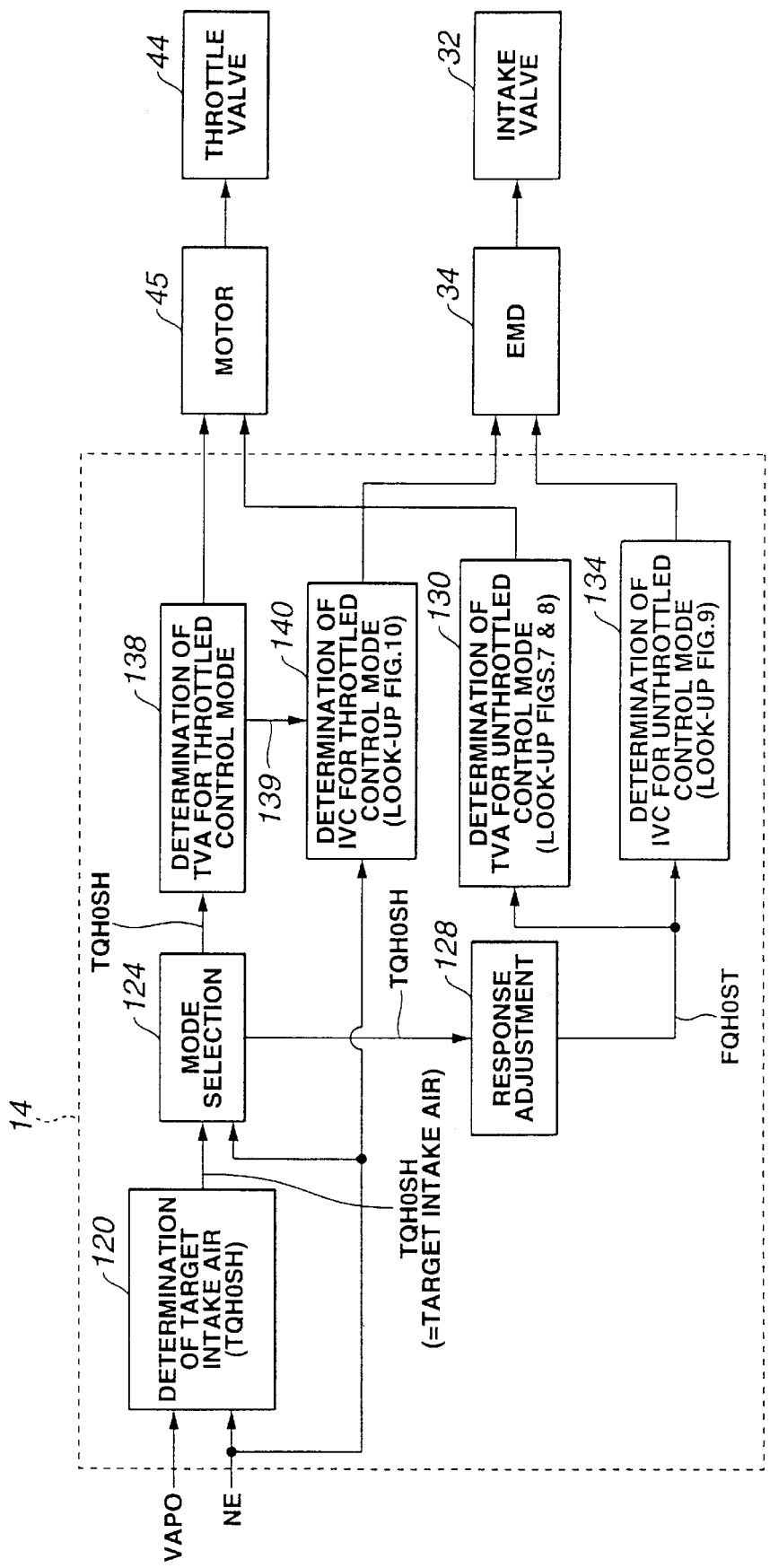
FIG. 4 is a control diagram of controls according to the present invention.

FIG. 4 provides a block diagram illustrating representative controllers for intake air control to provide engine torque control.

Figure 6:
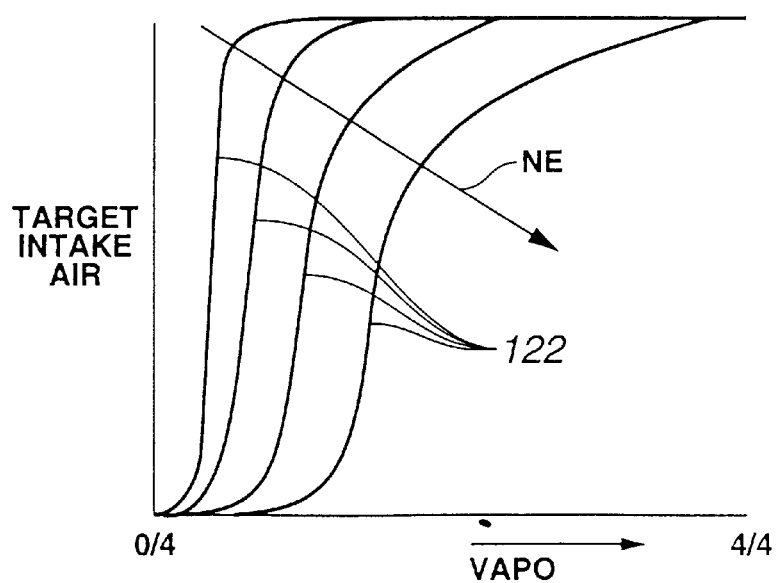
FIG. 6 is a graphical representation of retrievable mapped data of various values of target intake air (TQHOSH) against varying values of accelerator angular position (VAPO) with varying values of engine speed (NE) as parameter.

In the preferred embodiment, C/U 14 implements determination of a target intake air (TQHOSH) at a block 120 based on operator torque request command derived from accelerator position VAPO and engine speed NE. A group of curves 122 in FIG. 6 illustrate how target intake air TQHOSH varies against variation of VAPO at each of different values of engine speed NE. One representative example of determination of TQHOSH is disclosed in U.S. patent application Ser. No. 09/727,787, filed on Dec. 4, 2000, entitled "Unthrottled intake air control with partial delay for requested engine response performance," which has been commonly assigned herewith and claims the priority of Japanese Patent Applications Nos. 11-343910 (filed Dec. 2, 1 999), 11-345375 (filed Dec. 3, 1999), 11-345374 (filed Dec. 3, 1999), and 11-356401 (filed Dec. 15, 1999). The disclosure of this commonly assigned pending United States Patent Application has been hereby incorporated by reference in its entirety to clarify one example of processing, which may be performed at block 120. Another example of processing, which may be performed at block 120, is a table look-up operation of retrievable mapped data as illustrated in FIG. 6, stored in ROM 114, against various combination of values of VAPO and NE to determine a target value of TQHOSH. In this case, an intake air amount needed for idle speed control (IDS) should be added to the target value obtained by the table look-up operation.

Block 120 provides its output TQHOSH to a block 124. Block 124 inputs NE as well as TQHOSH and performs control mode selection. Block 124 compares the input value of TQHOSH with a threshold value on a curve 126 defining the boundary of the part-load high-speed operation range illustrated by the shadowed area in FIG. 5. For obtaining the threshold value on curve 126, a table look-up operation of mapped data of values in intake air on curve 126 against the input value of NE. The mapped data of threshold values is stored in ROM 114. In block 124, unthrottled intake air control is selected if TGHOSH holds a predetermined relation with threshold value 126. The predetermined relation involves TGHOSH greater than threshold value 126. Block 124 selects throttled intake air control if TGHOSH fails to hold the predetermined relationship. For example, throttled intake air control is selected when TGHOSH is less than threshold value 126.

Figure 11:
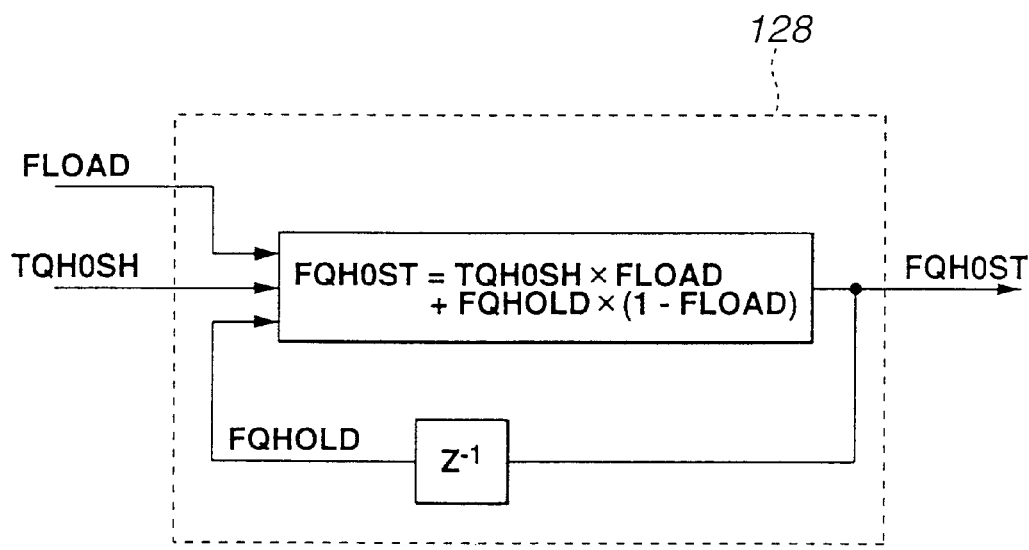
FIG. 11 is a mathematical representation of response adjustment used in FIG. 4.
Figure 12:
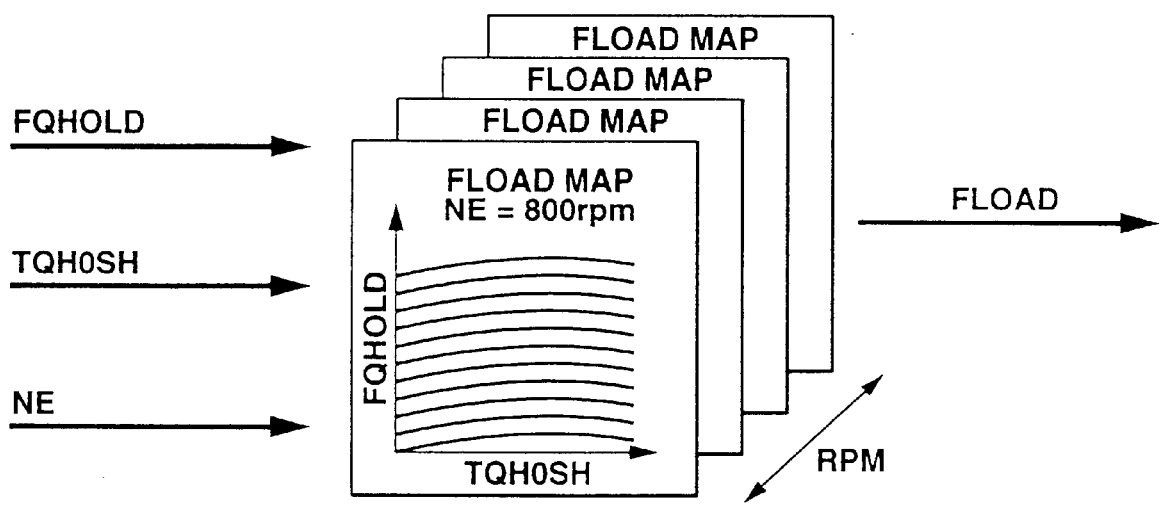
FIG. 12 is a schematic representation of retrievable mapped data of response correction coefficient represented by the reference character FLOAD.

Assuming now that unthrottled intake air control is selected, block 124 provides TQHOSH to a response adjustment block 128. FIG. 11 provides a mathematical representation of processing performed at block 128 using TQHOSH and response correction coefficient FLOAD. Values of FLOAD are determined based on data obtained by various experiments or tests or by computer simulations to provide an appropriate delay equivalent to the time constant caused by the volume of the intake manifold 26 downstream of throttle valve 44. FIG. 12 illustrates structure of retrievable data of values of FLOAD including a number of two-dimensional maps, called FLOAD maps, prepared against representative values of engine speed NE (RPM). Against the input value of NE, two maps are selected for table look-up operations against the current input value of TQHOSH and the preceding or old value of the processed or final target intake air value FQHOLD to provide two retrieved values. Using these two retrieved values, an interpolation is made to an appropriate value of FLOAD against the current value of NE. In the illustration, only one set of FLOAD maps are used to provide FLOAD. Preferably, different sets of FLOAD maps should be provided and used for acceleration and deceleration, respectively.

As illustrated in FIG. 11, using as inputs TQHOSH and FLOAD, block 128 generates, as an output, FQHOST by calculating the following equation:

$$FQHOST = TQHOSH \times FLOAD + FQHOLD \times (1-FLOAD) \quad (1).$$

where: FQHOLD is an old or preceding value of FQHOST.

Turning back to FIG. 4, block 128 provides FQHOST to a block 130 for determination of TVA for unthrottled intake air control mode and also to a block 134 for determination of IVC for unthrottled intake air control mode.

For determination of TVA in block 130, MPU 106 determines a target throttle position TVA so that a target boost pressure is maintained and held invariable during throttling intake air control by variable adjustment of IVC timing.

Figure 7:
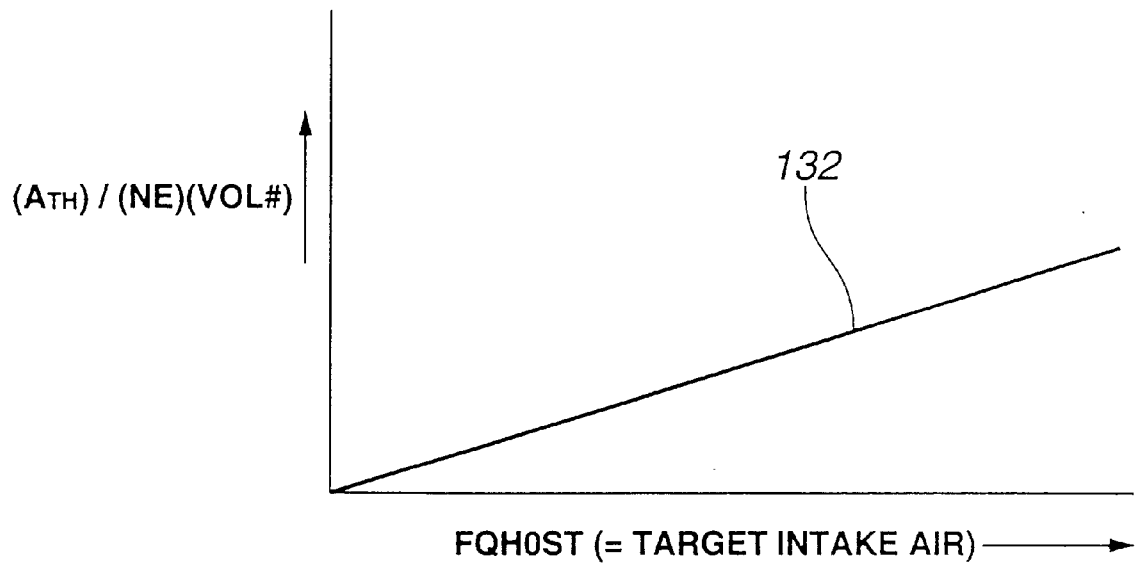
FIG. 7 is a graphical representation of retrievable table data of values of a ratio $(A_{TH})/(NE)(VOL\#)$ against values of final target intake air as delay processed (FQHOST), which ratio, abbreviated as an A/NV ratio, results from dividing an opening area (A) at throttle by a product of engine speed (NE) and engine displacement (VOL#).

MPU 106 performs table look-up operation of FIG. 7 against FQHOST to obtain an A/NV ratio, which results from dividing (opening area at throttle) $A_{TH}$ by a product of (engine speed) NE and (engine displacement) VOL#. The various values of A/NV ratio are so determined as to maintain the target boost pressure against varying values of FQHOST. As illustrated, the relationship between A/NV ratio and FQHOST may be approximated by a linear function 132. Thus, instead of the table look-up operation, the MPU 106 may determine A/NV ratio as the predetermined linear function 132 of FQHOST. From the linear function 132, it will be appreciated that the A/NV ratio decreases linearly as FQHOST decreases.

A constant boost pressure (negative pressure) is needed during unthrottled intake air control for canister purge operation.

Figure 8:
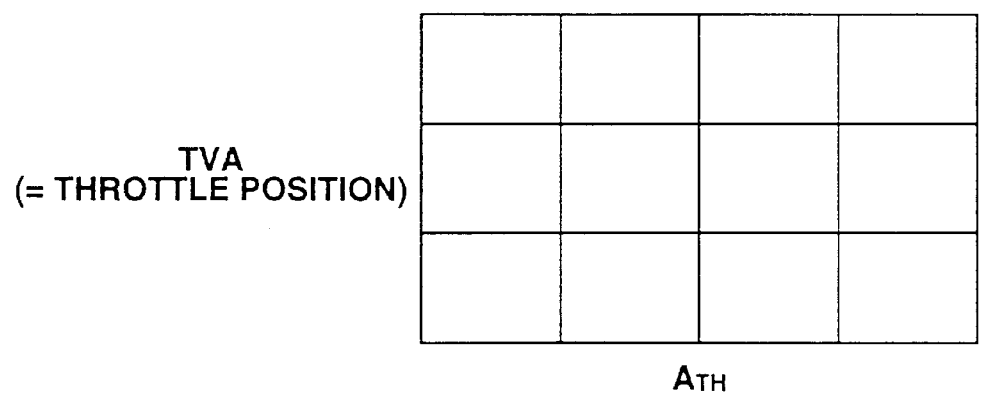
FIG. 8 is a schematic representation of a table of retrievable data of values of throttle position (TVA) against values of the area at throttle $(A_{TH})$.

Using the thus obtained A/NV ratio, MPU 106 calculates $A_{TH}$ by multiplying A/NV ratio with a product of NE and VOL#. Then, MPU 106 determines a target throttle position TVA by performing a look-up operation of a table as schematically shown in FIG. 8 against opening area $A_{TH}$. Block 130 provides TVA to motor 45 for throttle valve 44.

Figure 9:
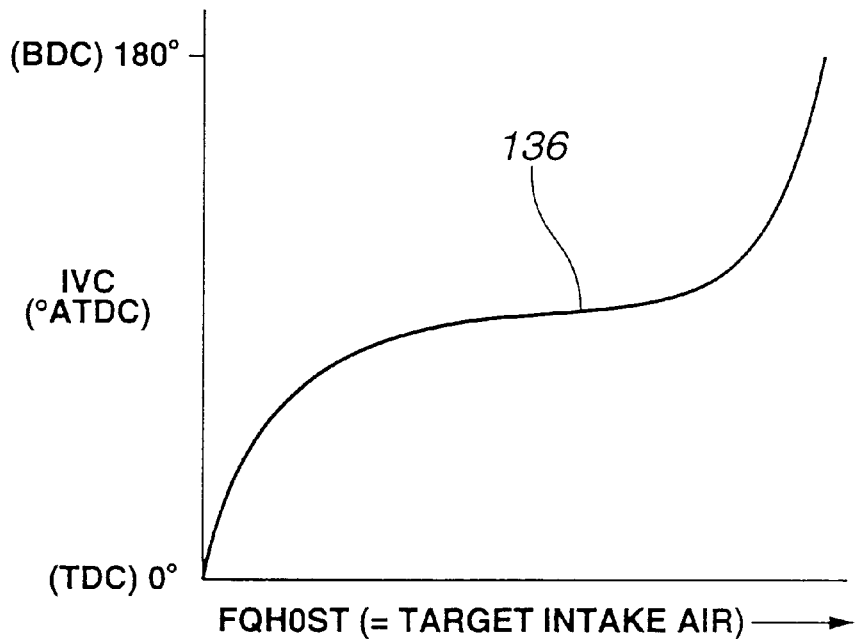
FIG. 9 is a graphical representation of retrievable table data of values of intake valve closure (IVC) timing of intake means against varying values of the final target air (FQHOST), illustrating IVC control schedule used for unthrottled intake air control

For determination of IVC for throttled intake air control in block 134, MPU 106 determines IVC timing by performing a table look-up operation of mapped retrievable values on a curve 136 shown in FIG. 9 against the input value of FQHOST. Block 134 determines a control signal in response to the determined IVC timing and provides the control signal to EMD 34 for closing intake valve 32 at the closure timing as indicated by determined IVC timing.

Let us now assume that throttled intake air control mode is selected in block 124. In this case, block 124 provides TQHOSH to block 138 for determination of TVA for throttled intake air control mode. Concurrently with the selection of throttled intake air control mode, a block 140 for determination of IVC for throttled intake air control mode is triggered to put into operation in response to a signal as indicated by an arrow 139.

For determination of TVA for throttled intake air control in block 138, MPU 106 determines area $A_{TH}$ against TQHOSH and NE. Then, MPU 106 conducts conversion of the determined area $A_{TH}$ to a target throttle position TVA by performing a look-up operation of a table as schematically shown in FIG. 8 against $A_{TH}$. Block 138 provides TVA to motor 45 for throttle valve 44.

Figure 10:
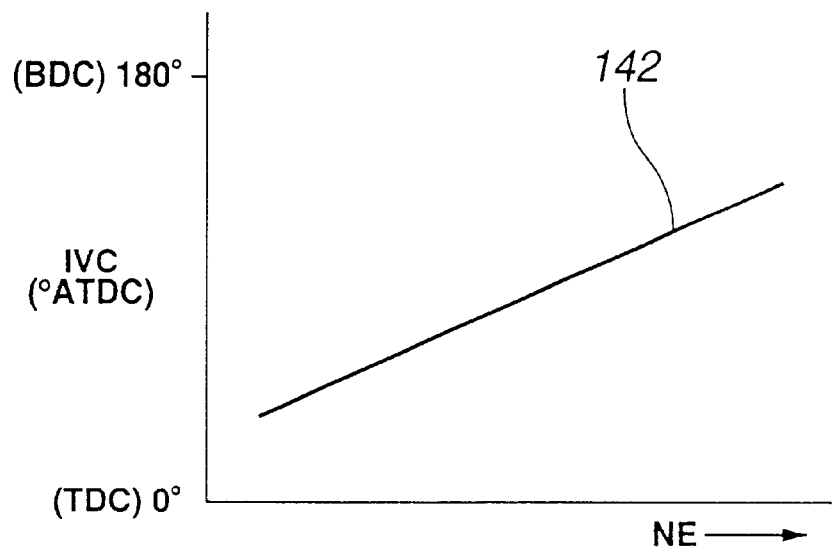
FIG. 10 is a graphical representation of retrievable table data of values of IVC timing against varying values of engine speed (NE), illustrating IVC control schedule for throttled intake air control.

For determination of IVC for throttled intake air control in block 140, MPU 106 inputs NE and determines as a function of NE a target value of IVC timing to accomplish the minimum valve opening duration at the input value of NE. This function is illustrated at 142 in FIG. 10. Each of the values of IVC timing on the function 142 provides the minimum valve duration at one of engine speed values of NE. Block 140 determines a control signal in response to the determined IVC timing and provides control signal to EMD 34 for closing intake valve 32 at the closure timing as indicated by determined IVC timing.

Figure 13:
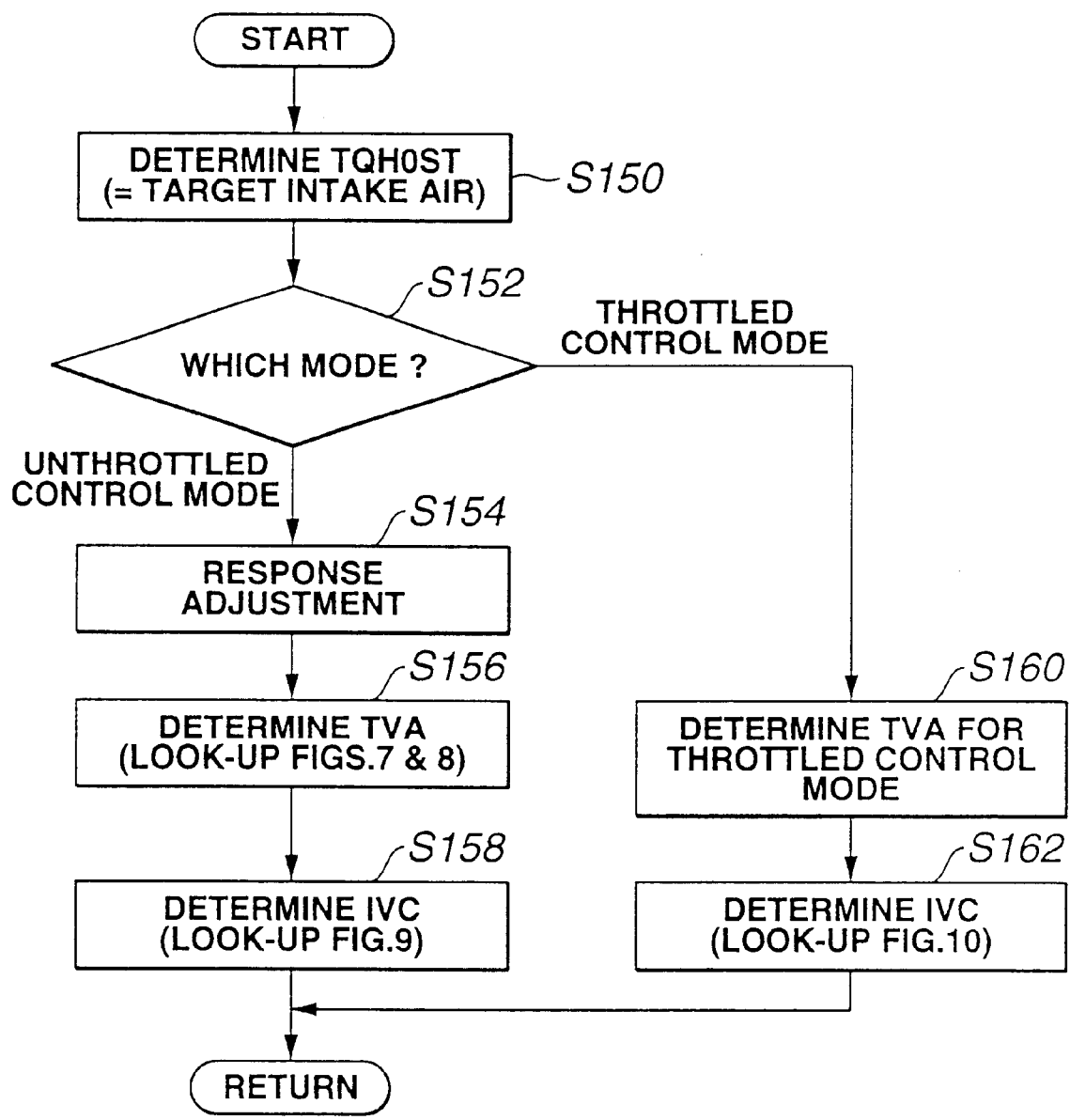
FIG. 13 is a flow chart illustrating control logic according to the present invention.

An example of how C/U 14 would implement the present invention can be understood with reference to FIG. 13. The flow chart of FIG. 13 illustrates control logic for providing unthrottled intake air control in coordination with throttled intake air control according to the present invention. One of ordinary skilled in the art will recognize that the control logic may be implemented in software, hardware, or a combination of software and hardware. Likewise, various processing strategies may be utilized without departing from the spirit or scope of the present invention. The sequences of operations illustrated is not necessarily required to accomplish the advantages of the present invention, and provided for ease of illustration only. Likewise, various steps may be performed in parallel or by dedicated electric or electric circuits.

In FIG. 13, step S150 represents determination of TQHOSH. Step S152 represents interrogation which of the two control modes is to be selected. Upon selection of unthrottled intake air control mode, the control routine proceeds to step S154 and steps S156 and S158. Upon selection of throttled intake air control mode, the control routine proceeds to steps S160 and S162.

Step S154 represents response adjustment in the manner as described in connection with FIGS. 11 and 12 to give FQHOST. Step S156 represents determination of TVA for unthrottled control mode by referring to FIGS. 7 and 8. Step S158 represents determination of IVC timing by referring to FIG. 9.

Step S160 represents determination of TVA for throttled intake air control. Step S162 represents determination of IVC timing by referring to FIG. 10.

Figure 14A:
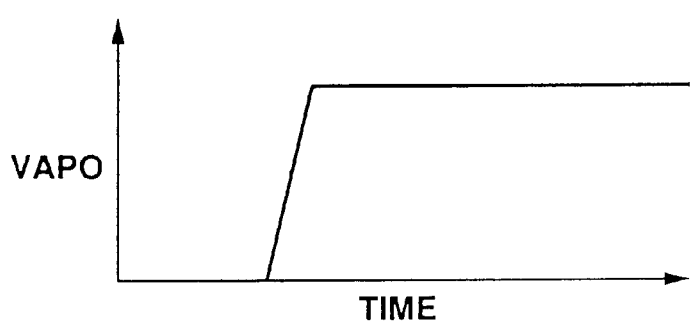
FIGS. 14A, 14B, 14C, 14D and 14E are graphical representations illustrating engine response performance with the benefit of the present invention as compared to engine response performance without the benefit of the present invention.
Figure 14B:
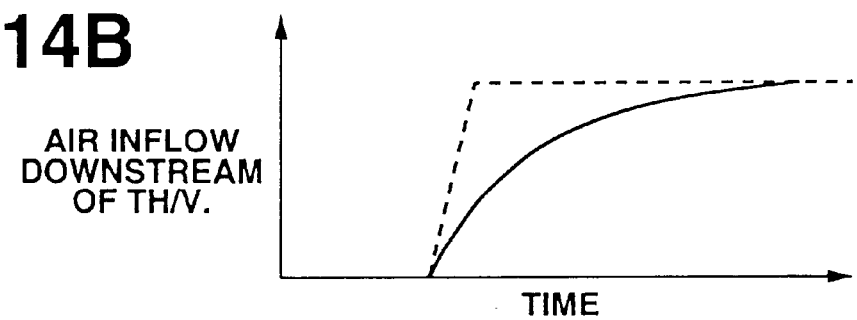
Figure 14C:
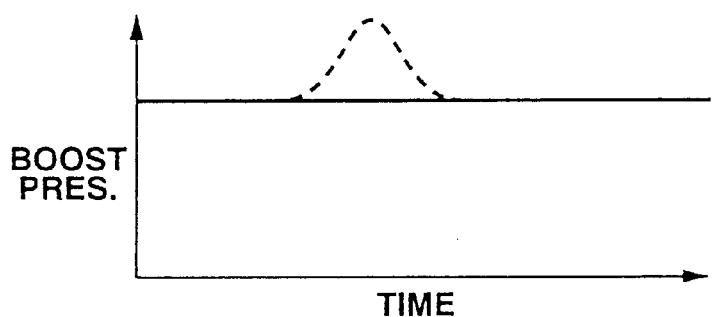
Figure 14D:
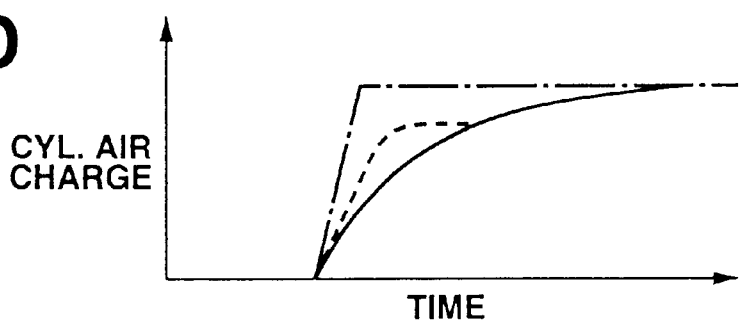
Figure 14E:
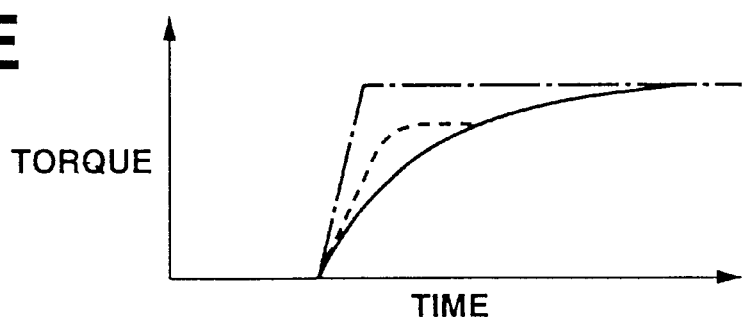

Referring to FIGS. 14A, 14B, 14C, 14D and 14E, the fully drawn line in each of FIGS. 14B to 14E illustrates a smooth transient response characteristic with the benefit of the present invention in response to a step-like increase of VAPO as illustrated in FIG. 14A. The dotted line in each of FIGS. 14B to 14E illustrates a transient response characteristic without the benefit of the present invention. In this case, response adjustment is made only on IVC for unthrottled control with no response adjustment made on TVA control for unthrottled control. From FIG. 14C, it is recognized the occurrence of disturbance in boost pressure. The one-dot chain line in each of FIGS. 14D and 14E illustrates another case where no response adjustment is made on both IVC and TVA controls for unthrottled intake air control mode.

In the preferred embodiment, the input TQHOSH to both of the blocks 130 and 134 is subject to the response adjustment at block 128. If desired, each of the outputs of blocks 130 and 134 may be subject to the response adjustment in the manner as described in connection with FIGS. 11 and 12.

While the present invention has been particularly described, in conjunction with preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of each of japanese Patent Applications No. 11-345378, filed Dec. 3, 1999, and No. 11-345373, filed Dec. 3, 1999, the disclosure of each of which is hereby incorporated by reference in its entirety.

What is claimed is:

1. A system for controlling an intake air amount of an engine, the engine having a combustion chamber provided with an intake valve together with an intake manifold provided with a throttle valve, the system comprising:
   a control unit configured to perform an unthrottled intake air control in which the intake air amount supplied to the combustion chamber is controlled by varying a valve timing of the intake valve with a boost pressure within the intake manifold maintained substantially constant by adjusting a throttle position of the throttle valve,
   wherein a delay is provided equivalent to a time constant due to a volume within the intake manifold downstream of the throttle valve to the varying valve timing of the intake valve for the unthrottled intake air control and the adjusting throttle position of the throttle valve for the unthrottled intake air control.

2. The system as claimed in claim 1, wherein the throttle valve is held in the neighborhood of a wide open throttle position when the unthrottled intake air control is performed.

3. The system as claimed in claim 1, wherein the control unit varies a closing timing of the intake valve when the unthrottled intake air control is performed.

4. The system as claimed in claim 1, wherein the control unit is further configured to perform a throttled intake air control in which the intake air amount supplied to the combustion chamber is controlled by varying the throttle position of the throttle valve with the valve timing of the intake valve held in the neighborhood of a predetermined valve timing, wherein the unthrottled intake air control is performed in a first operation range and the throttled intake air control is performed in a second operation range.

5. The system as claimed in claim 4, wherein the control unit is further configured to select one of the first operation range and the second operation range based on a target intake air amount and engine speed.

6. The system as claimed in claim 4, wherein the second operation range is a low-load high-speed operation range.

7. The system as claimed in claim 4, wherein the valve timing of the intake valve is held in the neighborhood of a minimum opening duration when the throttled intake air control is performed.

8. The system as claimed in claim 4, wherein the throttle position of the throttle valve for the throttled intake air control is varied without providing the delay.

9. The system as claimed in claim 1, wherein the delay is provided to a target intake air amount determined based on an accelerator position and engine speed, the valve timing of the intake valve and the throttle position of the throttle valve for the unthrottled intake air control being derived in response to the delayed target intake air amount.

10. A computer readable storage medium having stored therein data representing instructions executable by a computer to implement control of intake air of an engine, the engine having at least one combustion chamber provided with an intake valve together with an intake manifold provided with a throttle valve, wherein an opening and closing timing of the intake valve is adjustable independently from a crankshaft, the computer readable storage medium comprising:

instructions for performing an unthrottled intake air control by varying the opening and closing timing of the intake valve with a boost pressure within the intake manifold maintained substantially constant by adjusting a throttle position of the throttle valve; and instructions for providing a delay equivalent to a time constant due to a volume within the intake manifold downstream of the throttle valve to the varying opening and closing timing of the intake valve for the unthrottled intake air control and the adjusting throttle position of the throttle valve for the unthrottled intake air control.

11. A system for controlling intake air of an engine, the engine having at least one combustion chamber provided with an intake valve together with an intake manifold provided with a throttle valve, wherein an opening and closing timing of the intake valve is adjustable independently from a crankshaft, the system comprising:

a control unit configured to:
perform an unthrottled intake air control by varying the opening and closing timing of the intake valve with a boost pressure within the intake manifold maintained substantially constant by adjusting a throttle position of the throttle valve; and provide a delay equivalent to a time constant due to a volume within the intake manifold downstream of the throttle valve to the varying opening and closing timing of the intake valve for the unthrottled intake air control and the adjusting throttle position of the throttle valve for the unthrottled intake air control.

12. A system for controlling intake air of an internal combustion engine, the engine having at least one combustion chamber, the system comprising:

at least one intake valve provided for the combustion chamber;

an electromagnetic driver operatively connected to each intake valve for opening said intake valve;

an intake manifold with a throttle valve communicating with each intake valve; and sensors providing operation variables indicative of operator torque request command and engine speed;

a control unit receiving said operation variables to determine a first operation parameter indicative of target intake air based on said operator torque request command and said engine speed, said control unit being operative to make a selection based on said first operation parameter indicative of target intake air between a first operation range for unthrottled intake air control and a second operation range for throttled intake air control, said first and second operation range being separated from each other by a threshold value of target intake air at each of varying values of engine speed, said threshold value increases as engine speed increases, said control unit being operative to vary, with valve opening timing held in the neighborhood of the top dead center, valve closure timing of said intake valve with said throttle valve held in the neighborhood of the wide open throttle position to perform unthrottled intake air control upon selection of said first operation range, and vary throttle valve position of said throttle valve with valve timing of said intake valve held to provide a valve opening duration in the neighborhood of a predetermined valve opening duration that is variable with varying engine speed to perform throttled intake air control upon selection of said second operation range, said control unit being operative to provide a response adjustment to said first operation parameter indicative of said target intake air to give a processed first operation parameter, said control unit being operative to determine a second operation parameter indicative of a target valve closure timing of said intake valve based on said processed first operation parameter, said control unit being operative to determine a third operation parameter indicative of a target throttle position of said throttle valve based on said processed first operation parameter, and said control unit being operative to control said electromagnetic driver to cause said intake valve to close at valve closure timing indicated by said second operation parameter and to control said throttle valve to assume throttle position indicated by said third operation parameter for unthrottled intake air control during said first operation range.

13. A method for controlling intake air of an engine, the engine having at least one combustion chamber provided with an intake valve together with an intake manifold provided with a throttle valve, wherein an opening and closing timing of the intake valve is adjustable independently from a crankshaft, the method comprising:

performing an unthrottled intake air control by varying the opening and closing timing of the intake valve with a boost pressure within the intake manifold maintained substantially constant by adjusting a throttle position of the throttle valve; and providing a delay equivalent to a time constant due to a volume within the intake manifold downstream of the throttle valve to the varying opening and closing timing of the intake valve for the unthrottled intake air control and the adjusting throttle position of the throttle valve for the unthrottled intake air control.

14. The method as claimed in claim 13, further comprising:

performing a throttled intake air control by varying the throttle position of the throttle valve with the opening and closing timing of the intake valve held in the neighborhood of a predetermined opening and closing timing, wherein the throttle position of the throttle valve is held in the neighborhood of a wide open throttle position when the unthrottled intake air control is performed, and wherein the unthrottled intake air control is performed in a first operation range and the throttled intake air control is performed in a second operation range.

15. The method as claimed in claim 14, wherein the second operation range is an operation range in which a target intake air cannot be accomplished by varying the opening and closing timing of the intake valve for the unthrottled intake air control.

16. The method as claimed in claim 14, further comprising:

selecting one of the first operation range and the second Operational range based on a target intake air and engine speed.

17. The method as claimed in claim 14, further comprising:

selecting one of the first operation range and the second operation range based on a target intake air and engine speed, wherein the first operation range and the second operation range are separated from each other by a threshold value of the target intake air at each of varying values of engine speed, the threshold value increasing as engine speed increases, wherein the closing timing of the intake valve is varied in response to the target intake air with opening timing of the intake valve held in the neighborhood of top dead center such that the closing timing of the intake valve shifts toward bottom dead center as the target intake air increases when the unthrottled intake air control is performed, and wherein the closing timing of the intake valve is adjusted in response to engine speed to provide a valve opening duration in the neighborhood of the minimum valve opening duration when the throttled intake air control is performed.

18. The method as claimed in claim 14, wherein the delay is not provided for the throttle position of the throttle valve and the opening and closing timing of the intake valve when the throttled intake air control is performed.

19. The method as claimed in claim 13, wherein the delay is provided by generating a processed value (FQHOST) indicative of a target intake air, a correction coefficient (FLOAD) and an input value (TQHOSH) indicative of the target intake air, which processed value (FQHOST) is given by calculating the following equation:

$$FQHOST = TQHOSH \times FLOAD + FQHOLD \times (1-FLOAD)$$

Where: FQHOLD is the preceding value FQHOST.